July 30, 1940. W. MATZKA 2,209,345
STERILIZATION OF LIQUIDS
Filed Aug. 25, 1936 2 Sheets-Sheet 1

Inventor
Wincenty Matzka
By Mason & Porter
Attys.

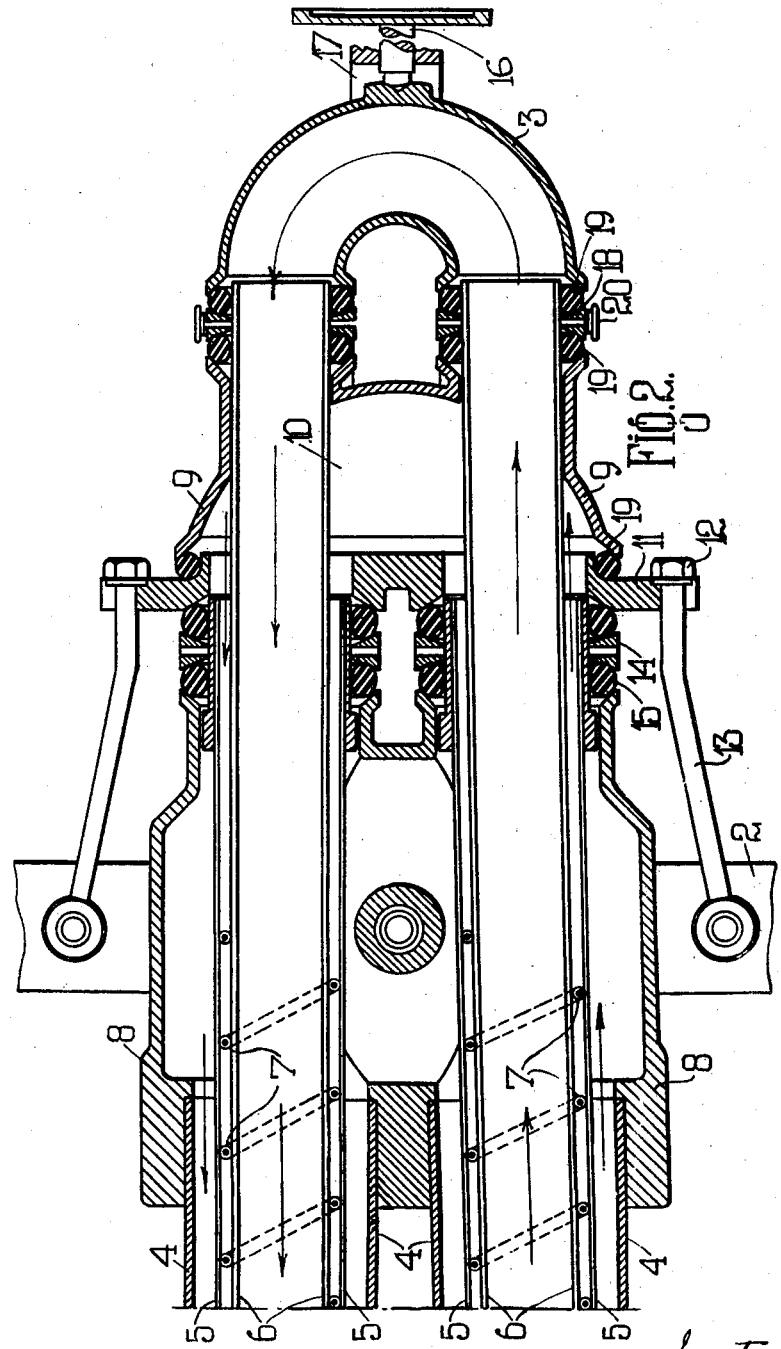

Patented July 30, 1940

2,209,345

UNITED STATES PATENT OFFICE 2,209,345

STERILIZATION OF LIQUIDS

Wincenty Matzka, Grasse, France, assignor to The Matzka Corporation, Wilmington, Del.

Application August 25, 1936, Serial No. 97,853
In Great Britain August 29, 1935

5 Claims. (Cl. 99—220)

This invention relates to improvements in the preservation of liquids.

The usual preserving methods such as pasteurization, sterilization by heat or the addition of chemical substances, have a detrimental effect on the flavour of fruit juices or other liquids. Methods have been proposed for the sterilization of liquids with the object of avoiding any profound changes in the composition of the liquid. Thus it is known, for example, to sterilize water by means of silver ions liberated from metallic silver. This method is, however, only successful as a rule with clear filtered water. It is difficult or impossible to secure sterilization by this means of liquid containing colloidal bodies such as are frequently present in liquids of animal or vegetable origin.

According to the process of the present invention, liquid to be sterilized is caused to flow in substantial absence of air between the closely spaced surfaces of two or more different metals one at least of which splits off metal ions and which are independently heated to at least two different temperatures substantially below 100° C. (preferably not above 80° C.) and the liquid is caused to flow with thorough mixing, i. e., turbulently, in contact with the metals for several minutes whereby it is subjected to thermal vibrations of high frequency. It is not necessary to apply any electric current from an external source, although this can be done if required. In any event the potential difference across the liquid is not allowed to exceed 1 to 1½ volts so as to avoid electrolytic decomposition. It is desirable to cause the liquid to flow with a circulatory movement and a translatory movement and to allow its speed of flow to be changed by occasional passage through large spaces. This facilitates adequate mixing. The liquid may be caused to flow in a helical path between the surfaces of the two different metals.

By the expression "different metals" is meant those metals which are of substantially different electrical potential i. e., spaced widely apart in the table of electro-chemical affinity. Thus there must be at least one metal which is of electro-negative character and another metal which is of electro-positive character. As the electro-positive metal nickel may be used or another electro-positive metal or an alloy which will not contaminate the liquid, such as aluminium or the like. As the electro-negative metal silver may be used or another electro-negative metal or alloy which will not contaminate the liquid such as one of the noble metals. Silver acts both as an electro-negative metal and as a metal splitting off metal ions and is therefore preferred; silver alloys, e. g. an alloy of silver and gold may be used.

To secure the best results the liquid should be passed a number of times between the surfaces of the different metals and thorough mixing of the liquid to be treated is produced by any suitable changing of its movement.

The conditions required for successful sterilization by the process of the present invention are therefore the following:

(1) The use of low temperatures acting for a short time, i. e. below the known pasteurization temperatures.

(2) Two or more different temperatures should be simultaneously employed differing from one another by about 15 to 20° C. The use of such different temperatures produces thermal vibrational changes in the liquid which unfavourably influence the living cells of the micro-organisms which are to be destroyed.

(3) These temperature differences are applied to the liquid through the two or more different metal surfaces which are relatively closely spaced.

(4) Any electric current which passes through the liquid between the metal surface must be so regulated that the potential difference does not exceed 1½ volts whereby electrolytic decomposition of the liquid is avoided. The temperature difference between the two metal surfaces increases the electric current which flows through the liquid by virtue of the different electrical character of the metals. An electric current can be supplied from an external source.

(5) At least one of the metals must be one which freely liberates metal ions destructive of micro-organisms and these metal ions must be thoroughly distributed throughout the liquid flowing between the metal surfaces.

(6) The operation must be carried out in an air free space with a movement of the liquid which involves direct flow, rotation and change of volume.

(7) It is desirable to form the metal surfaces as conduits or confining walls for the liquid to be treated, e. g., they may constitute metal tubes arranged one within another, and separated from one another and of such dimensions that the liquid comes into contact with at least 20 metres length of surface per minute.

(8) Liquids rich in pulp such as tomato or orange juice which generally contain entangled air should be treated for the removal of this by suitable known means before treatment.

(9) Fat-containing emulsions should be thoroughly homogenized before treatment.

(10) Instead of employing temperature differences for the production of thermal vibrational changes, these can be produced by mechanical forces obtained by electromagnet vibrators which produce vibrations of the same frequency as would be obtained by using, for example, warm water.

A preferred form of apparatus for carrying out the treatment of fruit juice or the like according to the present invention is illustrated in the accompanying drawings, in which:

Figure 2 is a sectional elevation of the right-hand end of a pair of tubes on a larger scale showing the internal construction in greater detail.

Figure 1:
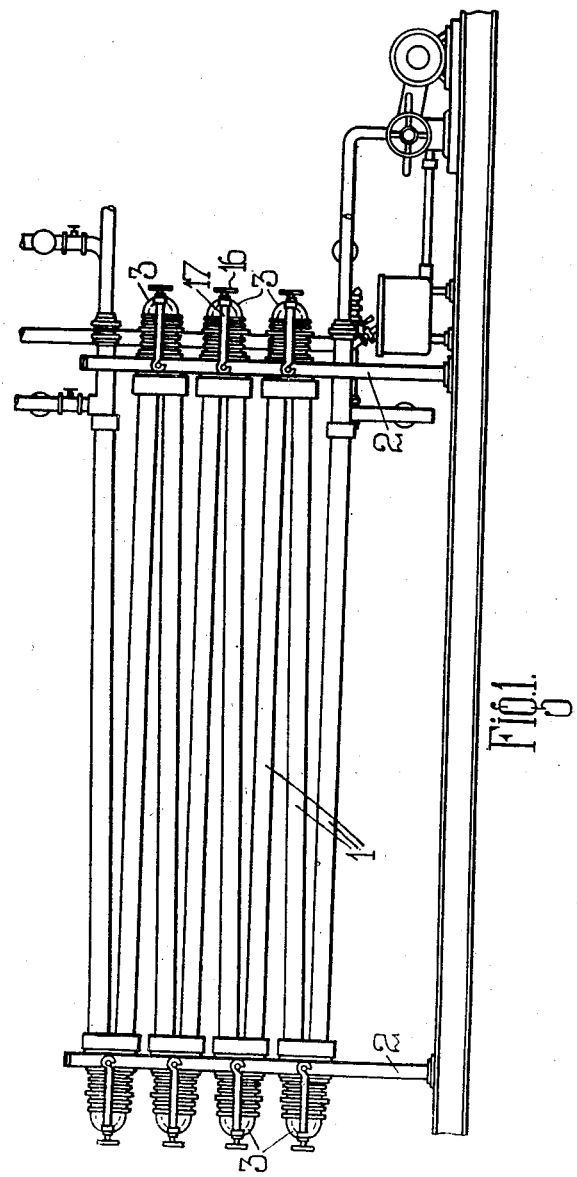
Figure 1 is an elevation of the sterilizing apparatus.

In the arrangement shown in Figure 1 there are eight pipes 1 supported at their ends in frames 2 and connected together by elbows 3. Additional pipes may be added preferably in pairs if required.

As shown in Figure 2 each of the pipes 1 is formed with an outer jacket 4 constituted for example of steel, iron, brass or aluminium, an intermediate tube 5 formed of pure nickel, and an inner tube 6 formed of silver. The nickel tube 5 is heated by warm water passed through the space between the jacket 4 and the tube 5 and the pipe 6 is heated by warm water flowing through it to a temperature different from that of the pipe 5. In the annular space between the pipes 5 and 6 the liquid to be sterilized is caused to flow. The width of this annular space is about 3 to 5 mm. and within it is mounted an insulating spiral 7 which serves to separate the tubes 5 and 6 and which also constrains the liquid to flow in a helical path.

To cause the liquids to flow from one pipe to the next adjacent pipe, there is provided a jacket 8 which surrounds the ends of both pipes 4 and forms a communicating space by which liquid may pass from the space between the lower pipes 4 and 5 and the space between the upper pipes 4 and 5 or vice versa. The tubes 5 and 6 extend through the space within the jacket 8 and the tube 5 terminates within a jacket 9 which also surrounds the ends of both tubes 5 and enables liquid passing from between the lower tubes 5 and 6 to enter the space between the upper tubes 5 and 6 or vice versa. The inner tube 6 extends to the elbow 3 so that this elbow serves to connect the interior spaces in the upper and lower tubes 6.

The jacket 9 is formed with a large space 10 which serves to facilitate a thorough mixing of any liquid passing therethrough.

For tightening the jacket 8 there are provided a collar 11, nuts 12, bolts 13 pivotally secured to the frame 2, movable washers 14 and rubber rings 15.

For tightening the elbow 3 are provided a screw 16 working in a shackle 17 (see Figure 1) also pivotally connected to the frame 2, washers 18 and rubber rings 19. Some or all of the washers 14 and 18 may be provided with terminals 20 for connection to a source of electric current which is thereby fed to the tubes 5 and 6.

In use the temperature of the water passed through the space between the jacket 4 and tube 5 is 45 to 60° C., while the temperature of the water passed in the same direction through the interior of the tubes 6 is 10 to 20° higher.

The fruit juice or other liquid to be treated is fed into the annular space between the pipes 5 and 6 and is constrained to pass in a helical path through the presence of the spiral 7. This sets up rotation in the liquid which when it emerges from this space passes into the jacket 9 and into the large space 10 where it undergoes a thorough mixing before passing again into the annular space between the tubes 5 and 6 of the upper pipe. It is thus given three movements, a translatory movement through the annular space, a rotational movement and a slowing down or expansion in the large space 10.

The spiral 7 secures correct spacing of the tubes 5 and 6, guards against irregular deflection of these tubes, prevents electrical contact between them and ensures a circulatory movement of the liquid.

If desired the last pipe may be employed for cooling the liquid or to serve as a heat exchanger between the treated liquid and fresh liquid to be treated.

The liquid to be sterilized is caused to flow over approximately 20 metres length of pipe per minute. It has been found that the living micro-organisms and spores contained in the liquid under treatment are rendered inactive or killed after about 4 minutes treatment in the apparatus. The liquid so treated therefore may be bottled and sealed in a substantially sterile condition.

The process and apparatus of the present invention may be employed for the sterilization of potable liquids or semi-liquids of any kind such as fruit juices, beer, milk, liquid egg and the like and more especially those containing colloidal matter.

I declare that what I claim is:

1. A process for the sterilization of liquids, which comprises causing the liquid to flow for several minutes with exclusion of air between and in contact with closely spaced surfaces of two different metals, one of said metals being a metal capable of splitting off bactericidal metal ions and the other metal being electro-positive to said first metal, heating said metal surfaces to and maintaining them at different elevated temperatures each below 100 degrees C., and effecting repeated changes of direction of movement of the liquid whereby to produce a turbulent flow and thorough mixing of the liquid while moving between said differently-heated surfaces.

2. Process for the sterilization of liquids, which comprises causing the liquid to flow for several minutes with exclusion of air between and in contact with closely spaced surfaces of two different metals, one of said metals being an electro-negative noble metal capable of splitting off bactericidal metal ions and the other metal being electro-positive to said noble metal, heating said metal surfaces to and maintaining them at different elevated temperatures each between 40 and 80 degrees C. and below the pasteurizing temperature of the liquid, and effecting frequent changes of direction of movement of the liquid whereby to produce a turbulent flow and thorough mixing of the liquid while moving between said differently-heated surfaces.

3. Process for the sterilization of liquids, which comprises causing the liquid to flow for several minutes with exclusion of air in a helical path between and in contact with closely spaced surfaces of two different metals, one of said metals being an electro-negative noble metal capable of splitting off bactericidal metal ions and the other metal being electro-positive to said noble metal, and heating said metal surfaces to and maintaining them at different elevated temperatures each between 40 and 80 degrees C. and below the pasteurizing temperature of the liquid, said movement in the helical path and between the closely spaced surfaces being effective for producing a turbulent flow and thorough mixing of the liquid while moving between said differently-heated surfaces.

4. Process for the sterilization of liquids, which comprises causing the liquid to flow for several minutes with the exclusion of air between and in contact with closely spaced surfaces of two different metals, one of said metals being silver and the other metal being electro-positive to silver, heating said metal surfaces to and maintaining them at different elevated temperatures each between 40 and 80 degrees C. and below the pasteurizing temperature of the liquid, and effecting repeated changes of direction of movement of the liquid whereby to produce a turbulent flow and thorough mixing of the liquid while moving between said differently-heated surfaces.

5. Process for the sterilization of liquids, which comprises causing the liquid to flow for several minutes with the exclusion of air in a helical path between and in contact with closely spaced surfaces of two different metals, one of said metals being silver and the other metal being electro-positive to silver, and heating said metal surfaces to and maintaining them at different elevated temperatures each between 40 and 80 degrees C. and differing from one another by 15 to 20 degrees C. and each being below the pasteurizing temperature of the liquid, said movement in the helical path and between the closely spaced surfaces being effective for producing a turbulent flow and thorough mixing of the liquid while moving between said differently-heated surfaces.

WINCENTY MATZKA.